US011254353B2

(12) United States Patent
Isshiki et al.

(10) Patent No.: US 11,254,353 B2
(45) Date of Patent: Feb. 22, 2022

(54) CONTROL DEVICE AND STEERING DEVICE

(71) Applicant: SHOWA CORPORATION, Saitama (JP)

(72) Inventors: Ken Isshiki, Tochigi (JP); Eishi Ishimaru, Tochigi (JP)

(73) Assignee: SHOWA CORPORATION, Saitama (JP)

( * ) Notice: Subject to any disclaimer, the term of this patent is extended or adjusted under 35 U.S.C. 154(b) by 401 days.

(21) Appl. No.: 16/538,360

(22) Filed: Aug. 12, 2019

(65) Prior Publication Data

US 2019/0359250 A1 Nov. 28, 2019

Related U.S. Application Data

(63) Continuation of application No. PCT/JP2017/017246, filed on May 2, 2017.

(30) Foreign Application Priority Data

Mar. 24, 2017 (JP) .............................. JP2017-059880

(51) Int. Cl.
*B62D 5/04* (2006.01)
*B62D 6/10* (2006.01)

(52) U.S. Cl.
CPC ............. *B62D 5/0463* (2013.01); *B62D 6/10* (2013.01)

(58) Field of Classification Search
CPC .................................. B62D 5/0463; B62D 6/10
See application file for complete search history.

(56) References Cited

U.S. PATENT DOCUMENTS 5,444,621 A 8/1995 Matsunaga et al.
6,851,679 B2 * 2/2005 Downey ............ B60G 17/0162
280/5.507

(Continued)

FOREIGN PATENT DOCUMENTS

DE 10 2008 053 008 A1 10/2009
EP 3173314 A1 * 5/2017 ........... B62D 5/0484

(Continued)

OTHER PUBLICATIONS

Machine translation of JP-6543393-B1 (Year: 2019).*

(Continued)

*Primary Examiner* — Jeff A Burke
*Assistant Examiner* — Mohamad O El Sayah
(74) *Attorney, Agent, or Firm* — Casimir Jones, SC; Robert A. Goetz (57) ABSTRACT

An embodiment of the present invention allows for application of an assist torque or reaction torque which causes a driver to feel less discomfort. An ECU (600) includes a control variable calculating section (611) configured to calculate a control variable for controlling a magnitude of the assist torque or reaction torque, with reference to a steering torque applied to a steering member (410); and a control variable correcting section (612) configured to correct the control variable calculated by the control variable calculating section, with reference to a roll rate of a vehicle body, a steering angle of the steering member, and a steering angle speed of the steering member.

7 Claims, 5 Drawing Sheets

(56) References Cited

U.S. PATENT DOCUMENTS

| | | | |
|---|---|---|---|
| 2008/0147275 A1* | 6/2008 | Okazaki | B62D 6/003 701/41 |
| 2011/0208391 A1 | 8/2011 | Mizuta et al. | |
| 2013/0197755 A1 | 8/2013 | Otake et al. | |
| 2014/0093128 A1 | 4/2014 | Teshima | |
| 2015/0232122 A1* | 8/2015 | Sakurai | B62D 6/008 701/41 |
| 2016/0031481 A1 | 2/2016 | Kentaro et al. | |
| 2017/0166247 A1* | 6/2017 | Gotou | B62D 5/0463 |
| 2017/0217479 A1* | 8/2017 | Tsubaki | B62D 5/0412 |
| 2018/0009437 A1* | 1/2018 | Ooba | B60W 30/12 |
| 2018/0086374 A1* | 3/2018 | Sato | B62D 1/20 |

FOREIGN PATENT DOCUMENTS

| | | | | |
|---|---|---|---|---|
| JP | | 1-141113 | | 6/1989 |
| JP | | 4-56616 | | 2/1992 |
| JP | | 5-229328 | | 9/1993 |
| JP | | 6-48139 | | 2/1994 |
| JP | | 6-482288 | | 2/1994 |
| JP | | 6-219307 | | 8/1994 |
| JP | | 7-156628 | | 6/1995 |
| JP | | 7-277167 | | 10/1995 |
| JP | | 8-108723 | | 4/1996 |
| JP | | 11-139131 | | 5/1999 |
| JP | | 2000-233664 | | 8/2000 |
| JP | | 2003-137121 | | 5/2003 |
| JP | | 2004-142550 | | 5/2004 |
| JP | | 2004-291815 | | 10/2004 |
| JP | | 2006-008055 | | 1/2006 |
| JP | | 2006-123827 | | 5/2006 |
| JP | | 2006-273185 | | 10/2006 |
| JP | | 2007-038766 | | 2/2007 |
| JP | | 2008-179300 | | 8/2008 |
| JP | | 2008179300 | A * | 8/2008 |
| JP | | 2008-231989 | | 10/2008 |
| JP | | 2009-101809 | | 5/2009 |
| JP | | 2010-116073 | | 5/2010 |
| JP | | 2012-101666 | | 5/2012 |
| JP | | 5026036 | B2 * | 9/2012 |
| JP | | 2013-107628 | | 6/2013 |
| JP | | 5298822 | B2 * | 9/2013 |
| JP | | 2013-212715 | | 10/2013 | |
| JP | | 2016-022830 | | 2/2016 | |
| JP | | 2016-104632 | | 6/2016 | |
| JP | | 2016-210352 | | 12/2016 | |
| JP | | 6543393 | B1 * | 7/2019 | B62D 6/008 |
| WO | WO 2010/092687 | | | 8/2010 | |

OTHER PUBLICATIONS

Machine translation of EP-3173314-A1 (Year: 2017).*
Machine translation of JP-5298822-B2 (Year: 2013).*
Machine translation of JP-5026036-B2 (Year: 2012).*
Machine translation of JP-2008179300-A (Year: 2008).*
Office Action for DE Application No. 112017007306.5, dated Jan. 28, 2021, 6 pages.
Office Action for CN Patent Application No. 201780086414.2, dated Jun. 2, 2021, 11 pages.
1st Office Action for 2017-059880, dated Jun. 6, 2017, 3 pages.
1st Office Action for 2017-059882, dated Jun. 13, 2017, 3 pages.
1st Office Action for 2017-059883, dated Jun. 13, 2017, 3 pages.
1st Office Action for 2017-059884, dated Jun. 6, 2017, 3 pages.
2nd Office Action for 2017-059880, dated Sep. 26, 2017, 2 pages.
2nd Office Action for 2017-059882, dated Oct. 24, 2017, 2 pages.
2nd Office Action for 2017-059883, dated Oct. 24, 2017, 2 pages.
2nd Office Action for 2017-059884, dated Sep. 26, 2017, 4 pages.
English Translation of International Preliminary Report on Patentability for PCT/JP2017/017246, dated Oct. 3, 2019, 9 pages.
English Translation of International Preliminary Report on Patentability for PCT/JP2017/017248, dated Oct. 3, 2019, 8 pages.
English Translation of International Preliminary Report on Patentability for PCT/JP2017/017249, dated Oct. 3, 2019, 11 pages.
English Translation of International Preliminary Report on Patentability for PCT/JP2017/017250, dated Oct. 3, 2019, 8 pages.
International Search Report for PCT/JP2017/017246, dated Jun. 27, 2017, 2 pages.
International Search Report for PCT/JP2017/017248, dated Jun. 13, 2017, 2 pages.
International Search Report for PCT/JP2017/017249, dated Jun. 13, 2017, 2 pages.
International Search Report for PCT/JP2017/017250, dated Jun. 27, 2017, 2 pages.

* cited by examiner

FIG. 5

CONTROL DEVICE AND STEERING DEVICE

This application is a Continuation of PCT International Application No. PCT/JP2017/017246 filed in Japan on May 2, 2017, which claims the benefit of Patent Application No. 2017-059880 filed in Japan on Mar. 24, 2017, the entire contents of which are hereby incorporated by reference.

TECHNICAL FIELD

The present invention relates to (i) a control device for applying an assist torque or reaction torque to a steering member, and (ii) a steering device.

BACKGROUND ART

Steering devices which apply an assist torque or a reaction torque to a steering member have been known. Further, in relation to steering devices, for example, Patent Literature 1 discloses a technique for correcting a desired assist current on the basis of a difference between a desired steering speed and an actual steering speed, and Patent Literature 2 discloses a technique for determining a steering condition of a steering wheel on the basis of a direction of steering torque and a rotation direction of an assist motor.

CITATION LIST

Patent Literature

[Patent Literature 1] Japanese Patent Application Publication, Tokukai, No. 2006-123827 (Publication Date: May 18, 2006)

[Patent Literature 2] Japanese Patent Application Publication, Tokukai, No. 2013-212715 (Publication Date: Oct. 17, 2013)

SUMMARY OF INVENTION

Technical Problem

With regard to a control device for applying an assist torque or reaction torque to a steering member, it is preferable to apply, to the steering member, an assist torque or reaction torque which causes a driver of a vehicle to feel less discomfort.

An object of an embodiment of the present invention is to provide a control device for applying, to a steering member, an assist torque or reaction torque which causes a driver to feel less discomfort.

Solution to Problem

In order to attain the above object, an embodiment of the present invention is directed to a control device which applies an assist torque or reaction torque to a steering member operated by a driver, the control device including: a control variable calculating section configured to calculate a control variable for controlling a magnitude of the assist torque or reaction torque, with reference to a steering torque applied to the steering member; and a control variable correcting section configured to correct the control variable calculated by the control variable calculating section, with reference to a roll rate of a vehicle body, a steering angle of the steering member, and a steering angle speed of the steering member.

Further, in order to attain the above object, an embodiment of the present invention is directed to a steering device including: a steering member operated by a driver; and a steering control section configured to apply an assist torque or reaction torque to the steering member, the steering control section including: a control variable calculating section configured to calculate a control variable for controlling a magnitude of the assist torque or reaction torque, with reference to a steering torque applied to the steering member; and a control variable correcting section configured to correct the control variable calculated by the control variable calculating section, with reference to a roll rate of a vehicle body, a steering angle of the steering member, and a steering angle speed of the steering member.

Advantageous Effects of Invention

An embodiment of the present invention makes it possible to apply an assist torque or reaction torque which causes a driver to feel less discomfort.

DESCRIPTION OF EMBODIMENTS

Embodiment 1

The following description will discuss Embodiment 1 of the present invention in detail.

(Configuration of Vehicle 900)

Figure 1:
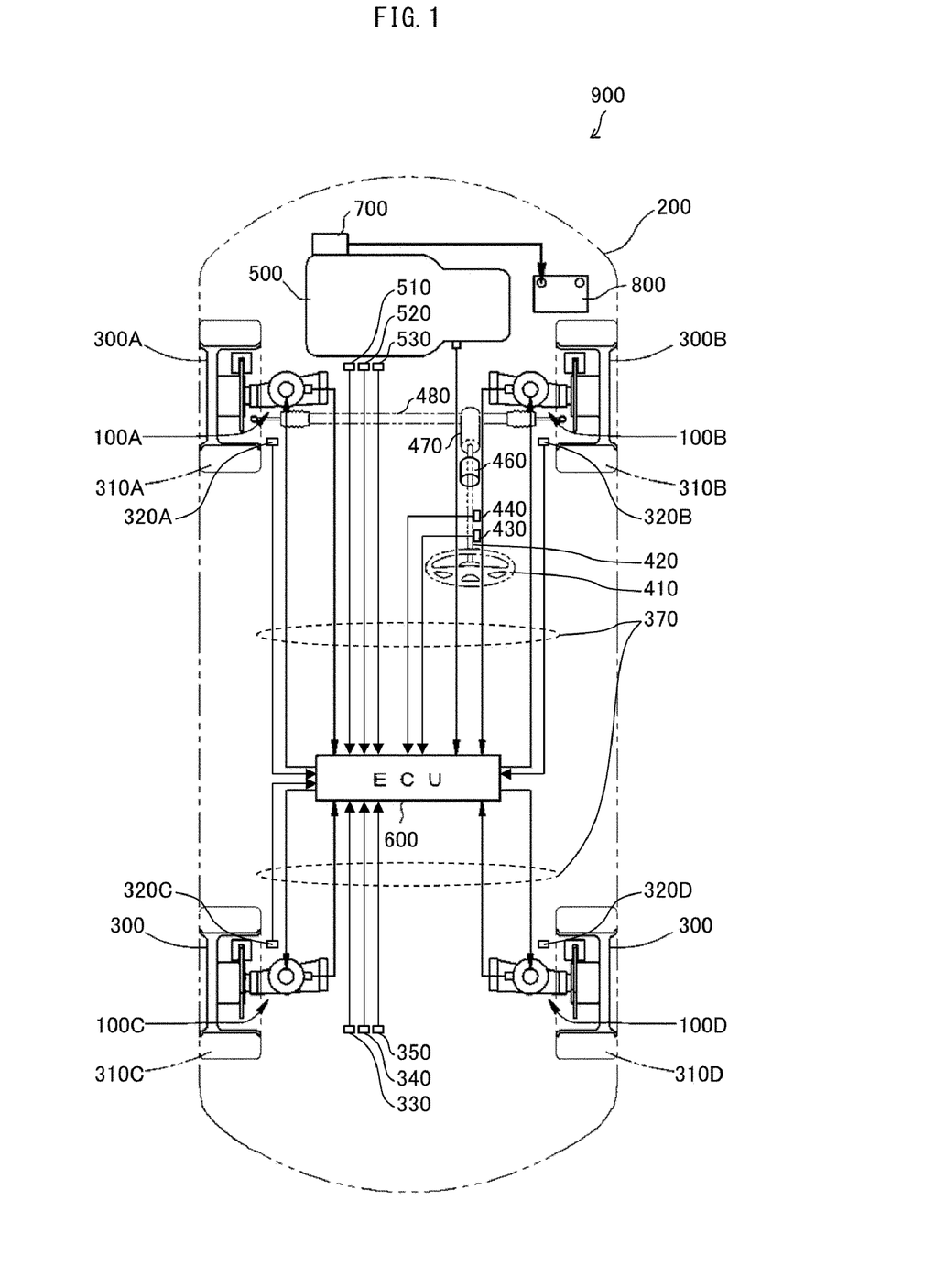
FIG. 1 is a diagram schematically illustrating a configuration of a vehicle in accordance with Embodiment 1 of the present invention.

FIG. 1 is a diagram schematically illustrating a configuration of a vehicle 900 in accordance with Embodiment 1 of the present invention. As illustrated in FIG. 1, the vehicle 900 includes suspensions 100, a vehicle body 200, wheels 300, tires 310, a steering member 410, a steering shaft 420, a torque sensor 430, a steering angle sensor 440, a torque applying section 460, a rack and pinion mechanism 470, a rack shaft 480, an engine 500, an electronic control unit (ECU) (control device) 600, a power-generating device 700 and a battery 800.

The wheels 300 to which the tires 310 are attached are suspended on the vehicle body 200 by the suspension 100. Since the vehicle 900 is a four-wheeled vehicle, four of a set including a suspension 100, a wheel 300, and a tire 310 are provided.

Note that each of a left front wheel, a right front wheel, a left rear wheel, and a right rear wheel includes a tire and a wheel, which are referred to as a tire 310A and a wheel 300A, a tire 310B and a wheel 300B, a tire 310C and a wheel 300C, or a tire 310D and a wheel 300D. Similarly, respective configurations associated with the left front wheel, the right front wheel, the left rear wheel, and the right rear wheel are denoted by signs "A", "B", "C", and "D".

The suspension 100 includes a hydraulic shock absorber, an upper arm and a lower arm. Further, the hydraulic shock absorber includes a solenoid valve which is an electromagnetic valve for adjusting a damping force which is caused by the hydraulic shock absorber. This, however, by no means limits Embodiment 1. The hydraulic shock absorber can employ an electromagnetic valve other than the solenoid valve, as the electromagnetic valve for adjusting a damping force. For example, the hydraulic shock absorber can be configured to include, as the electromagnetic valve, an electromagnetic valve which utilizes electromagnetic fluid (magnetic fluid).

The power-generating device 700 is attached to the engine 500. Power generated by the power-generating device 700 is accumulated in the battery 800

The steering member 410 which a driver operates is connected to one end of the steering shaft 420 so as to be capable of transmitting torque. Meanwhile, the other end of the steering shaft 420 is connected to the rack and pinion mechanism 470.

The rack and pinion mechanism 470 is a mechanism for converting rotation of the steering shaft 420 about an axis of the steering shaft 420 to displacement of the rack shaft 480 along a direction of an axis of the rack shaft 480. When the rack shaft 480 is displaced along the direction of the axis of the rack shaft 480, the wheel 300A and the wheel 300B are turned via a tie rod and a knuckle arm.

The torque sensor 430 detects a steering torque which is applied to the steering shaft 420, that is, a steering torque which is applied to the steering member 410, and supplies, to the ECU 600, a torque sensor signal indicative of a result of this detection. More specifically, the torque sensor 430 detects a torsion of a torsion bar, which is provided in the steering shaft 420, and outputs a result of this detection as the torque sensor signal. Note that the torque sensor 430 can be a well-known sensor such as a hall IC, an MR element, or a magnetostrictive torque sensor.

The steering angle sensor 440 detects a steering angle of the steering member 410, and supplies a result of this detection to the ECU 600.

The torque applying section 460 applies, to the steering shaft 420, an assist torque or a reaction torque in accordance with a steering control variable which is supplied from the ECU 600. The torque applying section 460 includes a motor for generating the assist torque or the reaction torque in accordance with the steering control variable, and a torque transmission mechanism for transmitting the torque generated by the motor to the steering shaft 420.

Note that, specific examples of the "control variable" herein encompass a current value, a duty ratio, a damping rate, and a damping ratio.

The steering member 410, the steering shaft 420, the torque sensor 430, the steering angle sensor 440, the torque applying section 460, the rack and pinion mechanism 470, the rack shaft 480, and the ECU 600 constitute a steering device in accordance with Embodiment 1.

Note that the expression "connected . . . so as to be capable of transmitting torque" in the above description means that two members are connected to each other such that rotation of one of the two members causes rotation of the other one of the two members. Example cases of such a connection encompass at least a case where the two members are integrally formed, a case where one of the two members is directly or indirectly fixed to the other one of the two members, and a case where the two members are connected to each other via a joint member or the like so as to interlock with each other.

Though steering devices described as examples above are each a steering device in which members from the steering member 410 to the rack shaft 480 are always mechanically connected to one another, this configuration by no means limits Embodiment 1. The steering device in accordance with Embodiment 1 can be, for example, a steering device of a steering by wire system. The matters described below in the present specification are applicable to steering devices of a steering by wire system.

The ECU 600 carries out overall control of various electronic devices of the vehicle 900. More specifically, the ECU 600 controls a magnitude of the assist torque or the reaction torque to be applied to the steering shaft 420, by adjusting the steering control variable to be supplied to the torque applying section 460.

Further, the ECU 600 supplies a suspension control variable to the solenoid valve which is provided in the hydraulic shock absorber in the suspension 100, so as to control opening/closing of the solenoid valve. In order to allow for this control, an electrical power line is provided. The electric power line is used for supplying a drive power from the ECU 600 to the solenoid valve.

Further, the vehicle 900 includes a wheel speed sensor 320 which is provided for each of the wheels 300 and detects a wheel speed of each wheel 300, a lateral G sensor 330 which detects an acceleration in a lateral direction of the vehicle 900, a longitudinal G sensor 340 which detects an acceleration in a longitudinal direction of the vehicle 900, a yaw rate sensor 350 which detects a yaw rate of the vehicle 900, an engine torque sensor 510 which detects a torque generated by the engine 500, an engine speed sensor 520 which detects the number of rotations of the engine 500, and a brake pressure sensor 530 which detects a pressure applied to brake fluid provided in a brake device. Results of detection by the above various sensors are supplied to the ECU 600.

Note that though not illustrated, the vehicle 900 includes a brake device which can be controlled by an antilock brake system (ABS), a traction control system (TCS), and a vehicle stability assist (VSA). The antilock brake system (ABS) prevents the wheels from locking up in breaking. The traction control system (TCS) prevents wheel slip of the wheels in acceleration of the vehicle 900. The vehicle stability assist (VSA) is a control system for stabilizing vehicle behavior, which system has an automatic braking function for, for example, yaw moment control in turning and a brake assist function.

The ABS, TCS, and VSA here compare a wheel speed determined in accordance with an estimated vehicle body speed and a wheel speed detected by the wheel speed sensor 320, and determines that the vehicle 900 is slipping in a case where a difference between respective values of these two wheel speeds is not less than a predetermined value. The ABS, the TCS, and the VSA are intended to stabilize the behavior of the vehicle 900, by carrying out the most appropriate brake control and traction control in accordance with a running state of the vehicle 900 through the above process.

Further, supply of the results of detection by the above various sensors to the ECU 600 and transmission of control signals from the ECU 600 to each section are carried out via a controller area network (CAN) 370.

(ECU 600)

Figure 2:
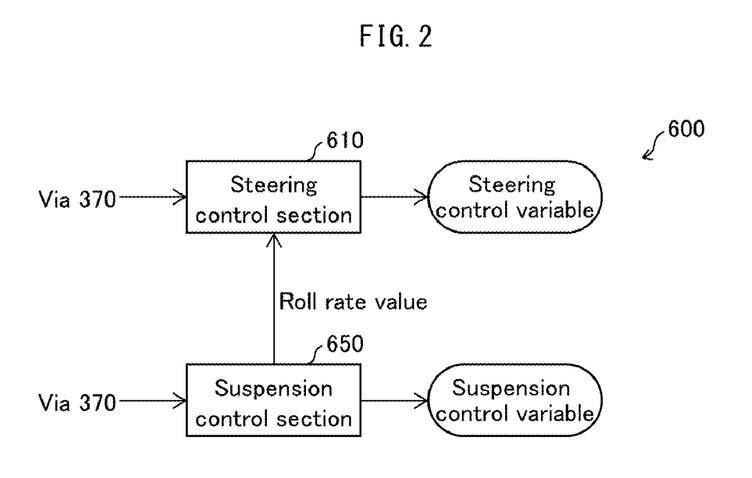
FIG. 2 is a block diagram schematically illustrating an ECU in accordance with Embodiment 1 of the present invention.

The following will specifically discuss the ECU 600 with reference to another drawing. FIG. 2 is a diagram schematically illustrating the ECU 600.

As illustrated in FIG. 2, the ECU 600 includes a steering control section 610 and a suspension control section 650.

The steering control section 610 refers to the results of detection by the various sensors in the CAN 370, and determines a level of the steering control variable which is to be supplied to the torque applying section 460.

Note that as used herein, the wording "referring to" may mean "using", "considering", "depending on" or the like.

The suspension control section 650 refers to the results of detection by the various sensors in the CAN 370, and determines a level of the control variable which is to be supplied to the solenoid valve provided in the hydraulic shock absorber of the suspension 100.

Further, as illustrated in FIG. 2, in the ECU 600, a roll rate value calculated by the suspension control section 650 is supplied to the steering control section 610. Then, the steering control section 610 refers to the roll rate value so as to determine the level of the steering control variable.

Note that as described later, the roll rate value can be configured to express a roll rate as a shift from a reference value of "0" which is a value in a case where inclination of the vehicle 900 has not changed for a predetermined minute time.

Further, the process of "determining a level of the control variable" includes a case where the level of the control variable is set to zero, that is, a case where no control variable is supplied.

Alternatively, it is possible to have a configuration in which the steering control section 610 and the suspension control section 650 are realized by separate ECUs, respectively. In this case, the steering control section 610 and the suspension control section 650 communicate with each other by use of communication means, so that control described in the present specification is carried out.

(Steering Control Section)

Figure 3:
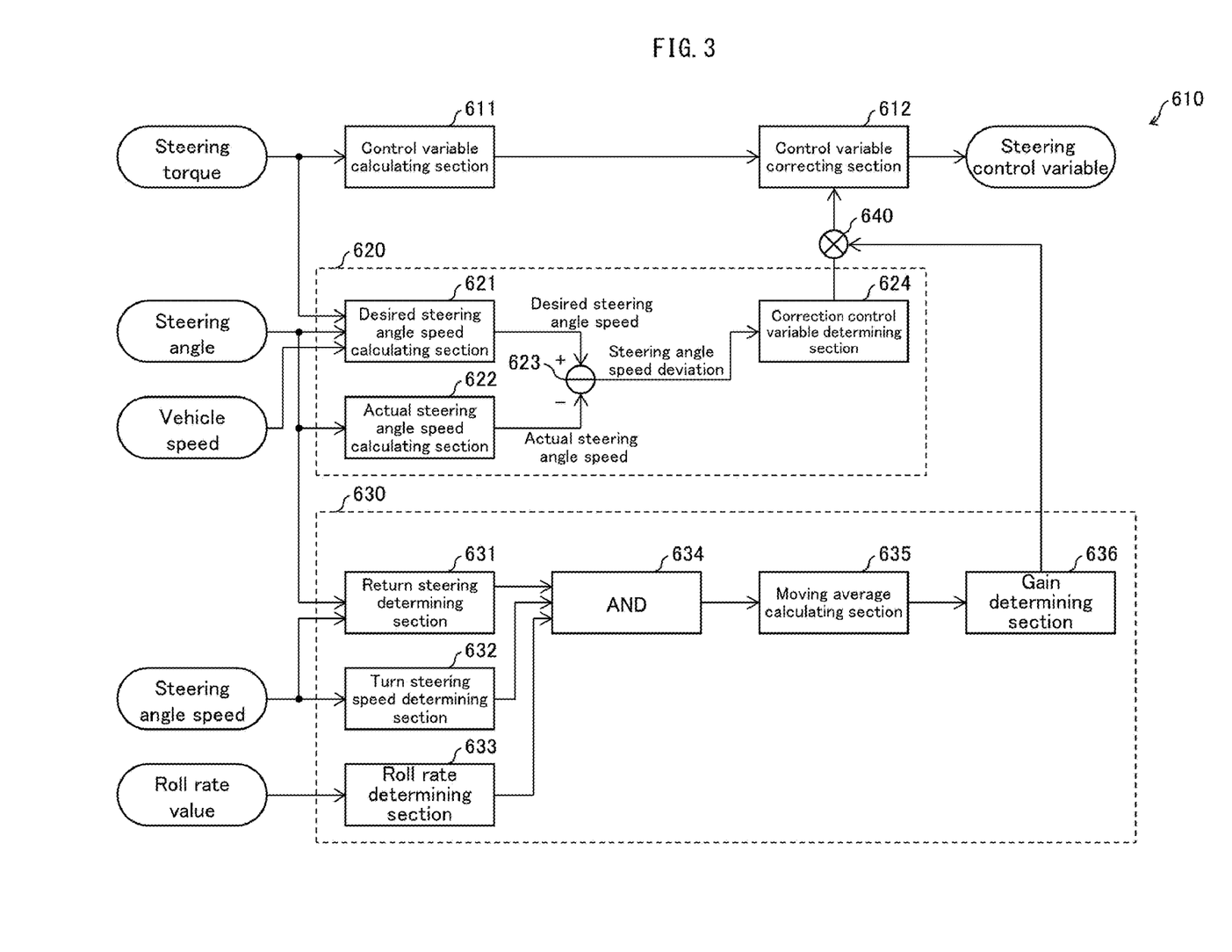
FIG. 3 is a block diagram illustrating an example configuration of a steering control section in accordance with Embodiment 1 of the present invention.

Next, the following will more specifically discuss the steering control section 610 with reference to FIG. 3. FIG. 3 is a block diagram illustrating an example configuration of the steering control section 610.

As illustrated in FIG. 3, the steering control section 610 includes a control variable calculating section 611, a control variable correcting section 612, a ω feedback section 620, a gain calculating section 630, and a multiplying section 640.

The control variable calculating section 611 calculates a control variable for controlling the magnitude of the assist torque or the reaction torque, with reference to the steering torque supplied from the torque sensor 430. The control variable calculated by the control variable calculating section 611 is supplied to the torque applying section 460 as the steering control variable, after the control variable is corrected by the control variable correcting section 612.

(ω Feedback Section)

The ω feedback section 620 determines a value of a correction control variable, with reference to the steering angle supplied from the steering angle sensor 440, a vehicle speed determined on the basis of the wheel speed detected by the wheel speed sensor 320, and the steering torque supplied from the torque sensor 430.

The ω feedback section 620 includes, for example, a desired steering angle speed calculating section 621, an actual steering angle speed calculating section 622, a subtracting section 623, and a correction control variable determining section 624, as illustrated in FIG. 3.

The desired steering angle speed calculating section 621 calculates a desired steering angle speed, with reference to the steering angle supplied from the steering angle sensor 440, the vehicle speed determined on the basis of the wheel speed detected by the wheel speed sensor 320, and the steering torque supplied from the torque sensor 430. A specific method of calculating the desired steering angle speed here by no means limits Embodiment 1. The desired steering angle speed calculating section 621 can be configured to refer to a desired steering angle speed map and a torque ratio map in calculating the desired steering angle speed.

The actual steering angle speed calculating section 622 specifies the actual steering angle by calculating a change over time in steering angle supplied from the steering angle sensor 440.

The subtracting section 623 subtracts the actual steering angle calculated by the actual steering angle speed calculating section 622, from the desired steering angle speed calculated by the desired steering angle speed calculating section 621, and supplies, to the correction control variable determining section 624, a deviation of steering angle side which deviation is a result of the above subtraction.

The correction control variable determining section 624 determines the value of the correction control variable in accordance with the deviation of steering angle side. A specific method of determining the value of the correction control variable by no means limits Embodiment 1. The correction control variable determining section 624 can be configured to refer to a steering angle speed deviation correction control variable map in determining the value of the correction control variable.

(Gain Calculating Section)

The gain calculating section 630 calculates a gain coefficient by which the correction control variable calculated by the ω feedback section 620 will be multiplied, with reference to the steering angle supplied from the steering angle sensor 440 and the roll rate value supplied from the suspension control section 650.

The gain calculating section 630 includes, for example, a return steering determining section 631, a turn steering speed determining section 632, a roll rate determining section 633, a logical conjunction calculating section 634, a moving average calculating section 635, and a gain determining section 636, as illustrated in FIG. 3.

The return steering determining section 631 determines whether or not the steering member 410 is in a return steering state, with reference to the steering angle supplied from the steering angle sensor 440 and the steering angle speed calculated with reference to the steering angle. In a case where the steering member 410 is in the return steering state, the return steering determining section 631 outputs "1" as a determination result or otherwise, outputs "0" as a determination result. Note that the vehicle 900 can be configured to include a steering angle speed sensor and then, the return steering determining section 631 can be configured to determine whether or not the steering member 410 is in the return steering state, with reference to the steering angle supplied from the steering angle sensor 440 and the steering angle speed supplied from the steering angle speed sensor.

Note that a process of determining the return steering state by the return steering determining section 631 is not limited to the above example. The return steering determining section 631 can be configured to determine whether or not the steering member 410 is in the return steering state, with reference to the torque sensor signal indicative of a result of detection by the torque sensor 430 and a rotation direction of the motor which is provided in the torque applying section 460. In this configuration, for example, the return steering determining section 631 can be configured to determine that the steering member 410 is in the return steering state in a case where a sign of the torque sensor signal and a sign of the rotation direction of the motor are different from each other.

The sign of the torque sensor signal here can be arranged, for example, such that the sign is positive in a case where the torsion bar is twisted in a clockwise direction whereas the sign is negative in a case where the torsion bar is twisted in a counterclockwise direction. The sign of the rotation direction of the motor can be arranged such that the sign is positive in a case where the motor rotating in that rotation direction allows a twist of the torsion bar in the clockwise direction to be eliminated whereas the sign is negative in a case where the motor rotating in that rotation direction allows a twist of the torsion bar in the counterclockwise direction to be eliminated.

The turn steering speed determining section 632 determines whether or not the steering angle speed calculated with reference to the steering angle supplied from the steering angle sensor 440 or an absolute value thereof is not less than a first predetermined value. In a case where the steering angle speed or the absolute value thereof is not less than the first predetermined value, the turn steering speed determining section 632 outputs "1" as a determination result or otherwise, outputs "0" as a determination result.

The roll rate determining section 633 determines whether or not the roll rate value supplied from the suspension control section 650 or an absolute value thereof is less than a second predetermined value. In a case where the roll rate value or the absolute value thereof is less than the second predetermined value, the roll rate determining section 633 outputs "1" as a determination result or otherwise, outputs "0" as a determination result.

The logical conjunction calculating section 634 performs a logical conjunction of the determination results from the return steering determining section 631, the turn steering speed determining section 632 and the roll rate determining section 633, and outputs a result of the logical conjunction. In other words, the logical conjunction calculating section 634 outputs "1" in a case where all the determination results outputted from the return steering determining section 631, the turn steering speed determining section 632, and the roll rate determining section 633 are "1", and otherwise, outputs "0".

The moving average calculating section 635 calculates a moving average of the above output from the logical conjunction calculating section 634, and outputs a result of this calculation. Note that the moving average calculating section 635 can be a low-pass filter.

The gain determining section 636 determines the gain coefficient in accordance with an output result of the moving average calculating section 635, and supplies, to the multiplying section 640, the gain coefficient thus determined. More specifically, in a case where a value obtained as a result of calculation of the moving average by the moving average calculating section 635 is more than 0, the gain determining section 636 determines a gain coefficient of more than 1. Furthermore, the gain determining section 636 sets a larger gain coefficient when the value obtained as the result of moving average calculation by the moving average calculating section 635 is larger. In other words, the gain determining section sets the gain coefficient such that as the value obtained as the result of moving average calculation by the moving average calculating section 635 increases, a reaction force applied to the steering member 410 increases.

The multiplying section 640 multiplies, by the gain coefficient determined by the gain determining section 636, the correction control variable determined by the correction control variable determining section 624, and supplies, to the control variable correcting section 612, a gained correction control variable which has been obtained by the above multiplication.

The control variable correcting section 612 generates a steering control variable by adding, to the control variable calculated by the control variable calculating section 611, the gained correction control variable which is supplied from the multiplying section 640. In other words, the control variable correcting section 612 corrects the control variable calculated by the control variable calculating section 611, with reference to the roll rate of the vehicle body 200, the steering angle of the steering member 410 and the steering angle speed of the steering member 410.

In this way the control variable correcting section 612 corrects the control variable calculated by the control variable calculating section 611, with reference to the roll rate of the vehicle body 200, the steering angle of the steering member 410 and the steering angle speed of the steering member 410. This makes it possible to apply, to the steering member 410, an assist torque or reaction torque which causes a driver to feel less discomfort.

Further, in the above configuration, the control variable correcting section 612 corrects the control variable in a case where (i) the steering member 410 is in the return steering state, (ii) the steering angle speed of the steering member 410 or the absolute value thereof is not less than the first predetermined value, and (iii) the roll rate value supplied from the suspension control section 650 or the absolute value thereof is less than the second predetermined value.

The inventors have recognized that in a case where (i) the steering member is in the return steering state, (ii) the steering angle speed of the steering member or the absolute value thereof is not less than the first predetermined value, and (iii) the roll rate value or the absolute value thereof is less than the second predetermined value, a phenomenon of so-called "torque loss" tends to occur.

Here, the following will describe a specific process in which the "torque loss" occurs. First, when a driver turns a steering wheel, rolling of the vehicle 900 occurs. The occurrence of the rolling leads to contraction of the hydraulic shock absorber which is provided in the suspension 100. Then, a positional relation between the tie rod and the lower arm changes. This consequently causes a change in toe angle. Further, this causes the rack shaft 480 to be pulled toward the hydraulic shock absorber which has contracted. In a case where the driver returns the steering member 410 in the above state, a reaction torque generated is only a reaction torque smaller than driver's expectation in a configuration including no gain calculating section 630. This may result in the phenomenon of "torque loss".

In the above configuration including the gain calculating section 630, the phenomenon of "torque loss" can be suitably prevented. Accordingly, it is possible to apply an assist torque or reaction torque which causes a driver to feel lesser discomfort.

In addition, in the above configuration, the control variable correcting section 612 corrects the control variable so that the reaction force applied to the steering member 410 will increase, in cases where (i) the steering member 410 is in the return steering state, (ii) the steering angle speed of the steering member 410 or the absolute value thereof is not less than the first predetermined value, and (iii) the roll rate value supplied from the suspension control section 650 or the absolute value thereof is less than the second predetermined value, as compared to otherwise cases.

Therefore, in the above configuration, the phenomenon of "torque loss" can be more suitably prevented. Accordingly, it is possible to apply an assist torque or reaction torque which causes a driver to feel lesser discomfort.

(Suspension Control Section)

Figure 4:
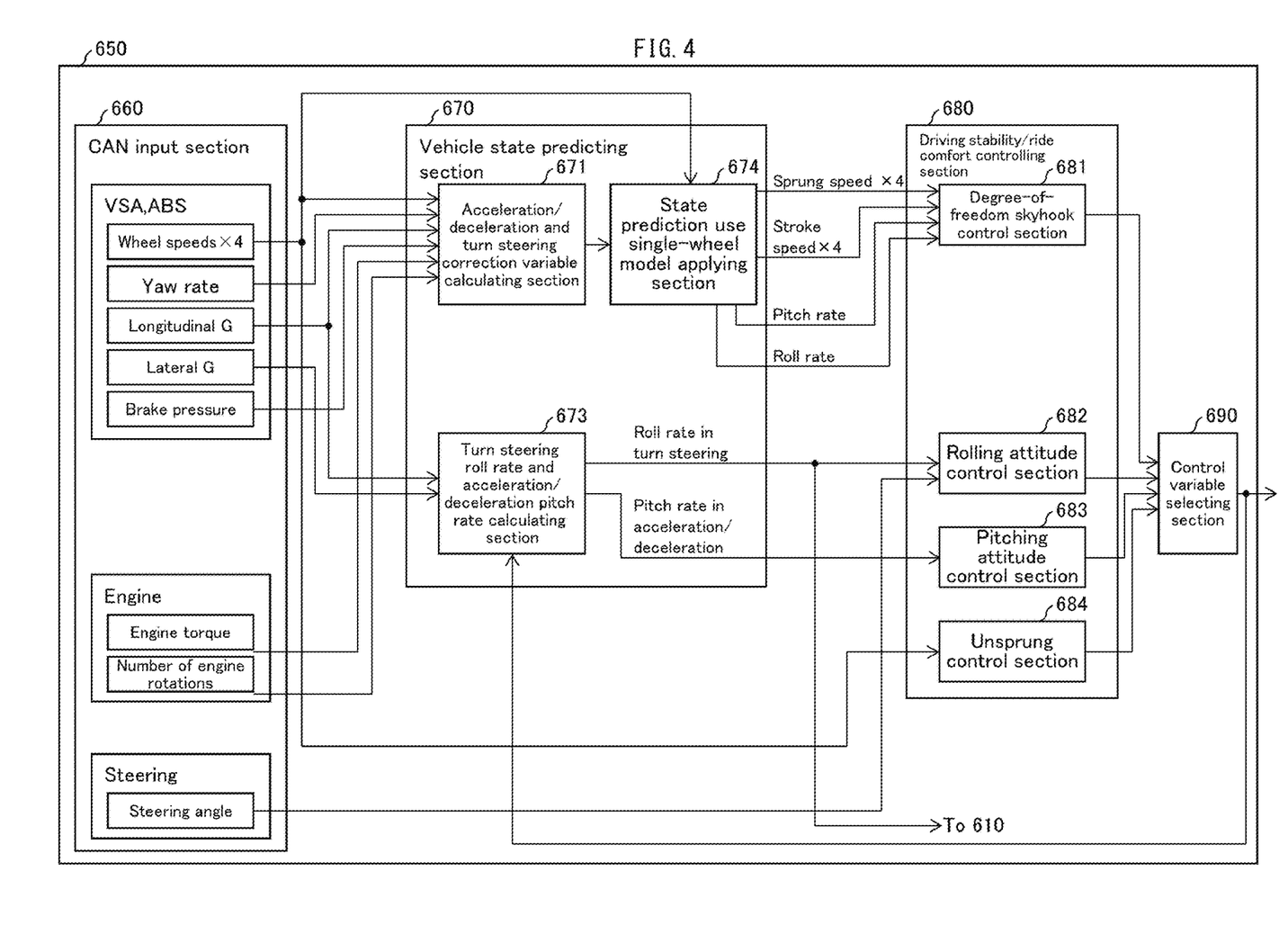
FIG. 4 is a block diagram illustrating an example configuration of a suspension control section in accordance with Embodiment 1 of the present invention.

Next, the following will discuss a suspension control section with reference to FIG. 4. FIG. 4 is a block diagram illustrating an example configuration of the suspension control section 650.

The suspension control section 650 includes a CAN input section 660, a vehicle state predicting section 670, a driving stability/ride comfort controlling section 680, and a control variable selecting section 690, as illustrated in FIG. 3.

The CAN input section 660 obtains various signals via the CAN 370. As illustrated in FIG. 3, the CAN input section 660 obtains the following signals (sensors in parentheses are signal sources).

wheel speeds of four wheels (wheel speed sensors 320A to 320D)
yaw rate (yaw rate sensor 350)
longitudinal G (longitudinal G sensor 340)
lateral G (lateral G sensor 330)
brake pressure (brake pressure sensor 530)
engine torque (engine torque sensor 510)
number of engine rotations (engine speed sensor 520)
steering angle (steering angle sensor 440)

The vehicle state predicting section 670 predicts the state of the vehicle 900 with reference to the various signals obtained by the CAN input section 660. The vehicle state predicting section 670 outputs, as results of the above prediction, sprung speeds of the four wheels, stroke speeds of the four wheels, a pitch rate, a roll rate, a roll rate in turn steering, and a pitch rate in acceleration/deceleration.

The vehicle state predicting section 670 includes an acceleration/deceleration and turn steering correction variable calculating section 671, a turn steering roll rate and acceleration/deceleration pitch rate calculating section 673, and a state prediction use single-wheel model applying section 674, as illustrated in FIG. 4.

The acceleration/deceleration and turn steering correction variable calculating section 671 calculates, with reference to the yaw rate, the longitudinal G, the wheel speeds of the four wheels, the brake pressure, the engine torque, and the number of rotations of engine, a speed in a longitudinal direction of the vehicle body, a ratio of an inner wheel difference (difference between tracks followed by front and back inner wheels in turning) and an outer wheel difference (difference between tracks followed by front and back outer wheels in turning), and an adjustment gain, and supplies results of the above calculation to the state prediction use single-wheel model applying section 674.

The turn steering roll rate and acceleration/deceleration pitch rate calculating section 673 calculates the roll rate in turn steering and the pitch rate in acceleration/deceleration, with reference to the longitudinal G and the lateral G. Results of this calculation are supplied to the state prediction use single-wheel model applying section 674.

Further, the turn steering roll rate and acceleration/deceleration pitch rate calculating section 673 supplies, as the roll rate value, the roll rate in turn steering thus calculated to the steering control section 610. The turn steering roll rate and acceleration/deceleration pitch rate calculating section 673 can be configured to further refer to the suspension control variable outputted from the control variable selecting section 690. The details of the turn steering roll rate and acceleration/deceleration pitch rate calculating section 673 will be described later with reference to a different drawing.

As described above, the turn steering roll rate and acceleration/deceleration pitch rate calculating section 673 supplies, to the steering control section 610, the roll rate in turn steering, as the roll rate value, which roll rate has been calculated with reference to the longitudinal G and the lateral G. Then, the steering control section 610 corrects the control variable for controlling the magnitude of the assist torque or the reaction torque with reference to the roll rate. This allows the steering control section 610 to more suitably correct the magnitude of the assist torque or the reaction torque.

Further, if the turn steering roll rate and acceleration/deceleration pitch rate calculating section 673 is configured to further refer to the suspension control variable outputted from the control variable selecting section 690 as described above, the steering control section 610 can more suitably correct the magnitude of the magnitude of the assist torque or the reaction torque.

The state prediction use single-wheel model applying section 674 applies, to each wheel, a state prediction use single-wheel model and calculates the sprung speeds of the four wheels, the stroke speeds of the four wheels, the pitch rate, and the roll rate, with reference to the results of the calculation by the acceleration/deceleration and turn steering correction variable calculating section 671. Results of this calculation are supplied to the driving stability/ride comfort controlling section 680.

The driving stability/ride comfort controlling section 680 includes a skyhook control section 681, a rolling attitude control section 682, a pitching attitude control section 683, and an unsprung control section 684.

The skyhook control section 681 suppresses shaking of the vehicle when the vehicle goes over a bumpy road surface and carries out ride comfort control (damping control) for increasing ride comfort. The skyhook control section 681 determines a desired skyhook control variable, with reference to, for example, the sprung speeds of the four wheels, the stroke speeds of the four wheels, the pitch rate, and the roll rate, and supplies a result of this determination to the control variable selecting section 690.

More specifically, for example, the skyhook control section 681 sets a damping force base value on the basis of the sprung speeds with reference to a sprung-damping force map. Further, the skyhook control section 681 calculates a desired skyhook damping force by multiplying, by a skyhook gain, the damping force base value thus set. Then, the skyhook control section 681 determines the desired skyhook control variable on the basis of the desired skyhook damping force and the stroke speeds.

The rolling attitude control section 682 carries out rolling attitude control with reference to the roll rate in turn steering and the steering angle, and determines a steering angle proportional desired control variable which is a desired control variable in accordance with the steering angle, a steering angle speed proportional desired control variable which is a desired control variable in accordance with the steering angle speed, and a roll rate proportional desired control variable which is a desired control variable in accordance with the roll rate. Then, the rolling attitude control section 682 supplies results of the above determination to the control variable selecting section 690.

Alternatively, the rolling attitude control section 682 can be configured to calculate various desired control variables described above, with reference to a steering torque signal indicative of the steering torque. It is also possible to have a configuration in which the suspension control section 610 supplies the steering torque signal to the suspension control section 650 and the steering control section 610 refers to the steering torque signal. Note that it is also possible to use a phase-compensated steering torque signal as the torque signal. It can be expected that this configuration will achieve higher ride comfort.

Since the rolling attitude control section 682 carries out rolling attitude control with reference to the roll rate in turn steering which roll rate has been calculated by the turn steering roll rate and acceleration/deceleration pitch rate calculating section 673 as described above, it is possible to carry out a suitable attitude control. Further, the roll rate in turn steering calculated by the turn steering roll rate and acceleration/deceleration pitch rate calculating section 673 is used not only for the rolling attitude control by the rolling attitude control section 682 but also for correction of the magnitude of the assist torque or the reaction torque by the steering control section 610 as described above. This makes it possible to carry out a suitable attitude control and to provide a feeling of comfortable steering while suppressing an increase in the number of constituent elements.

The pitching attitude control section 683 carries out pitching control with reference to the pitch rate in acceleration/deceleration, determines a desired pitching control variable, and then supplies a result of this determination to the control variable selecting section 690.

The unsprung control section 684 carries out damping control below a spring of the vehicle 900 with reference to the wheel speeds of the four wheels, and determines a desired unsprung damping control variable. A result of this determination is supplied to the control variable selecting section 690.

The control variable selecting section 690 outputs, as the suspension control variable, a desired control variable whose value is the largest among the desired skyhook control variable, the steering angle proportional desired control variable, the steering angle speed proportional desired control variable, the roll rate proportional desired control variable, the desired pitching control variable, and the desired unsprung damping control variable.

(Turn Steering Roll Rate and Acceleration/Deceleration Pitch Rate Calculating Section)

Figure 5:
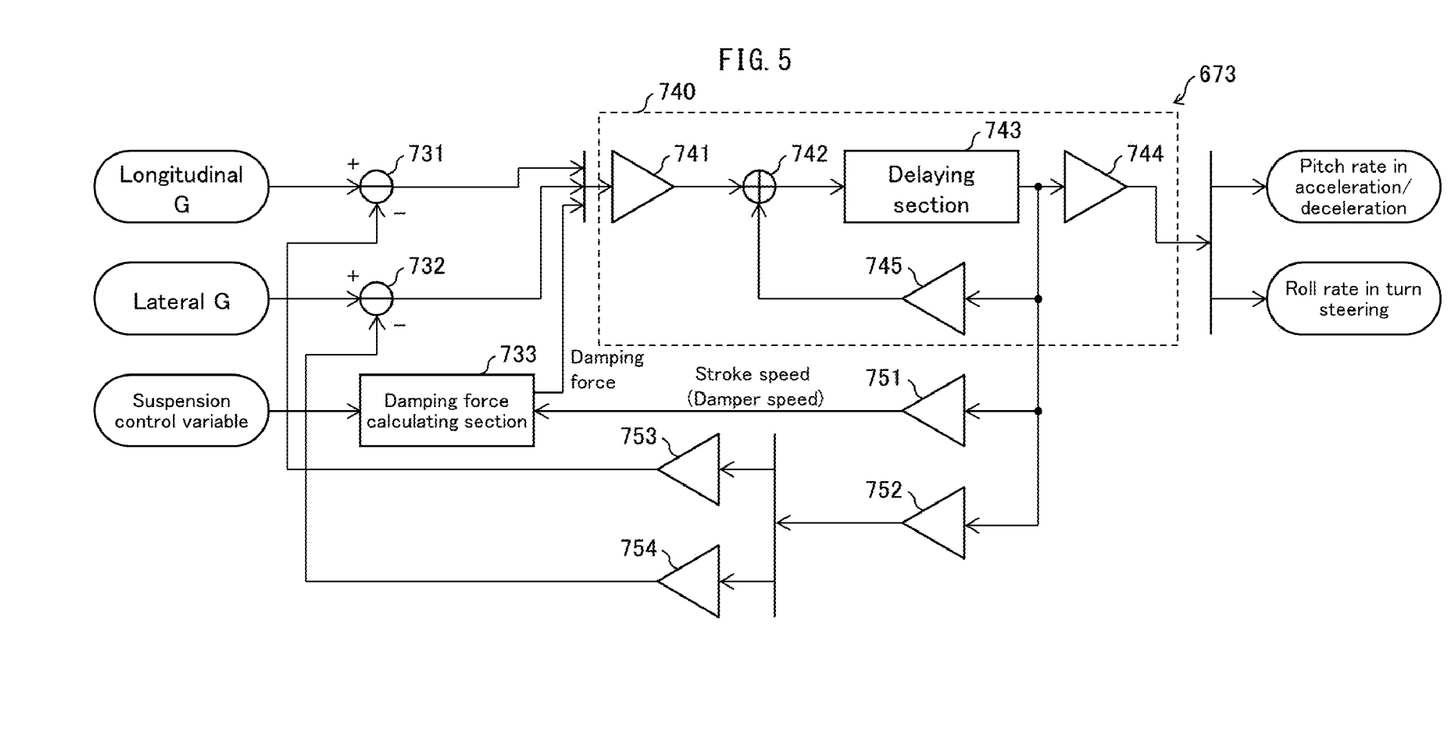
FIG. 5 is a block diagram illustrating an example configuration of a turn steering roll rate and acceleration/deceleration pitch rate calculating section in accordance with Embodiment 1 of the present invention.

Next, the following will specifically describe the turn steering roll rate and acceleration/deceleration pitch rate calculating section 673 with reference to a different drawing.

FIG. 5 is a block diagram illustrating an example configuration of the turn steering roll rate and acceleration/deceleration pitch rate calculating section 673. The turn steering roll rate and acceleration/deceleration pitch rate calculating section 673 includes subtracting sections 731 and 732, a damping force calculating section 733, a model applying section 740, and amplifying sections 751 to 754, as illustrated in FIG. 5.

Further, the model applying section 740 includes amplifying sections 741, 744, and 745, an adding section 742, and a delaying section 743.

The subtracting section 731 subtracts, from a signal indicative of the longitudinal G, an output signal from the amplifying section 753, and outputs a result of this subtraction to the amplifying section 741.

The subtracting section 732 subtracts, from a signal indicative of the lateral G, an output signal from the amplifying section 754, and outputs a result of this subtraction to the amplifying section 741.

The damping force calculating section 733 calculates a damping force of each wheel, with reference to the suspension control variable and an output from the amplifying section 751. Here, the output from the amplifying section 751 corresponds to an estimated value for a stroke speed (damper speed) of the hydraulic shock absorber which is provided in the suspension 100. Further, the damping force of each wheel is calculated by the damping force calculating section 733 with reference to a damping force map.

The model applying section 740 calculates the pitch rate in acceleration/deceleration, by applying a pitching behavior model to the longitudinal G after subtraction, which longitudinal G is outputted from the subtracting section 731, and the damping force of each wheel, which damping force is outputted from the damping force calculating section 733.

The model applying section 740 calculates the roll rate in turn steering, by applying a rolling behavior model to the lateral G after subtraction, which lateral G is outputted from the subtracting section 732, and the damping force of each wheel, which damping force is outputted from the damping force calculating section 733.

The pitch rate in acceleration/deceleration and the roll rate in turn steering are calculated by the model applying section 740, by adjusting respective rates of amplification in the amplifying sections 741, 744, and 745 and an amount of delay by the delaying section 743.

The amplifying section 741 amplifies an output from each of the subtracting section 731, the subtracting section 732, and the damping force calculating section 733, and supplies a result of this calculation to the adding section 742. The adding section 742 adds, to an output from the amplifying section 741, a value obtained by amplifying an output from the delaying section 743 by the amplifying section 745, and supplies a result of this addition to the delaying section 743. The amplifying section 744 outputs the output from the delaying section 743 as the pitch rate in acceleration or the roll rate in turn steering.

The amplifying section 751 amplifies the output from the delaying section 743, and supplies a result of this amplification to the damping force calculating section 733. The amplifying section 752 amplifies the output from the delaying section 743. The output from the amplifying section 751 is amplified by the amplifying section 753 or the amplifying section 754, and then inputted to the subtracting section 731 or the subtracting section 732.

Note that the turn steering roll rate and acceleration/deceleration pitch rate calculating section 673 can output "0" as a reference value of the roll rate in turn steering in a case where the inclination of the vehicle 900 has not changed for a predetermined minute time. Further, the turn steering roll rate and acceleration/deceleration pitch rate calculating section 673 can provide the roll rate in turn steering with a dead zone of approximately ±0.5. Here, the sign "+" indicates a left side of the vehicle 900 and the sign "−" indicates a right side of the vehicle 900.

[Software Implementation Example]

Control blocks of the ECU 600 (particularly, the steering control section 610 and the suspension control section 650) can be realized by a logic circuit (hardware) provided in an integrated circuit (IC chip) or the like or can be alternatively realized by software as executed by a central processing unit (CPU).

In the latter case, the ECU 600 includes a CPU that executes instructions of a program that is software realizing the foregoing functions; a read only memory (ROM) or a storage device (each referred to as "storage medium") in which the program and various kinds of data are stored so as to be readable by a computer (or a CPU); and a random access memory (RAM) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be supplied to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST 200 vehicle body
600 ECU (control device)
610 steering control section
611 control variable calculating section
612 control variable correcting section
620 ω feedback section
630 gain calculating section
650 suspension control section
673 roll rate calculating section
900 vehicle

The invention claimed is:

1. A control device which applies an assist torque or reaction torque to a steering member operated by a driver, the control device comprising:
 a control variable calculating section configured to calculate a control variable for controlling a magnitude of the assist torque or reaction torque, with reference to a steering torque applied to the steering member; and
 a control variable correcting section configured to correct the control variable calculated by the control variable calculating section, with reference to a roll rate of a vehicle body, a steering angle of the steering member, and a steering angle speed of the steering member,
 in a case where (i) the steering member is in a return steering state, (ii) the steering angle speed of the steering member or an absolute value thereof is not less than a first predetermined value, and (iii) the roll rate or an absolute value thereof is less than a second predetermined value, the control variable correcting section correcting the control variable calculated by the control variable calculating section, so as to increase a reaction force applied to the steering member.

2. The control device as set forth in claim 1, further comprising:
 a roll rate calculating section configured to calculate the roll rate, with reference to an acceleration in a longitudinal direction of the vehicle body and an acceleration in a lateral direction of the vehicle body.

3. The control device as set forth in claim 2, wherein:
 the roll rate calculating section calculates the roll rate, additionally with reference to a suspension control variable for controlling a damping force of a suspension.

4. The control device as set forth in claim 3, further comprising:
 a rolling attitude control section configured to determine a desired control variable for suspension control, by carrying out rolling attitude control with reference to the roll rate calculated by the roll rate calculating section.

5. A steering device comprising:
 a steering member operated by a driver; and
 a steering control section configured to apply an assist torque or reaction torque to the steering member,
 the steering control section including:
  a control variable calculating section configured to calculate a control variable for controlling a magnitude of the assist torque or reaction torque, with reference to a steering torque applied to the steering member; and
  a control variable correcting section configured to correct the control variable calculated by the control variable calculating section, with reference to a roll rate of a vehicle body, a steering angle of the steering member, and a steering angle speed of the steering member,
 in a case where (i) the steering member is in a return steering state, (ii) the steering angle speed of the steering member or an absolute value thereof is not less than a first predetermined value, and (iii) the roll rate or an absolute value thereof is less than a second predetermined value, the control variable correcting section correcting the control variable calculated by the control variable calculating section, so as to increase a reaction force applied to the steering member.

6. The steering device as set forth in claim 5, wherein:
 the roll rate of the vehicle body is referred to when a suspension control variable is calculated by a suspension control section configured to control a damping force of a suspension.

7. The steering device as set forth in claim 6, wherein:
 the steering control section supplies, to the suspension control section, a torque signal indicative of the steering torque applied to the steering member.

* * * * *